United States Patent
Forsdike et al.

(10) Patent No.: US 9,731,377 B2
(45) Date of Patent: Aug. 15, 2017

(54) BONDING METHOD

(71) Applicant: ROLLS-ROYCE PLC, London (GB)

(72) Inventors: John Forsdike, Worcestershire (GB); Daniel Clark, Derbyshire (GB)

(73) Assignee: ROLLS-ROYCE plc, London (GB)

( * ) Notice: Subject to any disclaimer, the term of this patent is extended or adjusted under 35 U.S.C. 154(b) by 264 days.

(21) Appl. No.: 14/645,956

(22) Filed: Mar. 12, 2015

(65) Prior Publication Data

US 2015/0283642 A1    Oct. 8, 2015

(30) Foreign Application Priority Data

Apr. 3, 2014  (GB) .................................. 1405988.5
Apr. 11, 2014 (GB) .................................. 1406527.0

(51) Int. Cl.
*B23K 11/02*    (2006.01)
*B33Y 10/00*    (2015.01)
(Continued)

(52) U.S. Cl.
CPC ............ *B23K 11/02* (2013.01); *B22F 3/1055* (2013.01); *B22F 7/004* (2013.01); *B23K 11/18* (2013.01); *B23K 20/023* (2013.01); *B23K 20/026* (2013.01); *B23K 20/16* (2013.01); *B23K 20/233* (2013.01); *B23K 20/24* (2013.01);
(Continued)

(58) Field of Classification Search
CPC ...... B23K 11/02; B23K 11/18; B23K 20/023; B23K 20/026; B23K 20/16; B23K 20/233; B23K 20/24; B23K 26/34; B23K 2201/001; B23K 2203/14; B22F 7/02; B22F 7/04; B22F 3/1055; B22F 3/1146; B22F 2998/10
See application file for complete search history.

(56) References Cited

U.S. PATENT DOCUMENTS

| | | | |
|---|---|---|---|
| 3,716,347 A | 2/1973 | Bergstrom et al. | |
| 6,413,589 B1* | 7/2002 | Li | B22F 1/025 427/193 |
| 8,141,225 B2 | 3/2012 | Tuppen et al. | |
| 8,186,565 B1* | 5/2012 | Pyzik | B23K 20/10 228/110.1 |

(Continued)

FOREIGN PATENT DOCUMENTS

| | | |
|---|---|---|
| EP | 2286953 A1 | 2/2011 |
| JP | S62-056380 A | 3/1987 |

(Continued)

OTHER PUBLICATIONS

Mar. 8, 2016 Search Report issued in European Patent Application No. 15 15 8479.

(Continued)

*Primary Examiner* — Brian Jennison

(74) *Attorney, Agent, or Firm* — Oliff PLC

(57) ABSTRACT

A method of bonding a first article to a second article, each article having a respective bond surface. The method comprises interposing a porous interlayer region between the bond surfaces of the first and second articles and subsequently using electrical resistance heating to locally heat the interlayer region under contact pressure to a bonding temperature below the melting temperature of the interlayer and the first and second articles to thereby bond the interlayer to the first and second articles to form a bonded article. The interlayer has a porosity of between approximately 10% and 30%.

15 Claims, 6 Drawing Sheets

(51) Int. Cl.
*B23K 11/18* (2006.01)
*B23K 20/02* (2006.01)
*B23K 20/16* (2006.01)
*B23K 20/233* (2006.01)
*B23K 20/24* (2006.01)
*B23K 26/34* (2014.01)
*B22F 3/105* (2006.01)
*B22F 7/00* (2006.01)
*B23K 101/00* (2006.01)
*B23K 103/14* (2006.01)
*B23P 6/00* (2006.01)
*B22F 3/11* (2006.01)

(52) U.S. Cl.
CPC .............. *B23K 26/34* (2013.01); *B33Y 10/00* (2014.12); *B22F 3/1146* (2013.01); *B22F 2998/10* (2013.01); *B23K 2201/001* (2013.01); *B23K 2203/14* (2013.01); *B23P 6/005* (2013.01); *Y02P 10/295* (2015.11)

(56) References Cited

U.S. PATENT DOCUMENTS

2009/0098310 A1\* 4/2009 Hippensteel ........ A61F 2/30767
427/576
2011/0035924 A1 2/2011 Tuppen et al.

FOREIGN PATENT DOCUMENTS

| RU | 2184018 C1 | 6/2002 |
| SU | 1094708 A1 | 5/1984 |
| SU | 1100065 A1 | 6/1984 |
| SU | 1407731 A1 | 7/1988 |
| SU | 1449289 A1 | 1/1989 |

OTHER PUBLICATIONS

Miyazaki, Hiroyuki et al., "Joining of Alumina with a Porous Alumina Interlayer," Ceramics International, vol. 38, (2012), pp. 1149-1155.
Oct. 13, 2014 Search Report issued in British Patent Application No. 1406527.0.

\* cited by examiner

BONDING METHOD

FIELD OF THE INVENTION

The present invention relates to a method of bonding articles, and particularly to a method of bonding articles by a solid state bonding process.

BACKGROUND TO THE INVENTION

It is often desirable to join two or more components together by welding. One known welding technique comprises diffusion bonding. Diffusion bonding is a solid state welding technique, in which heat and high pressure is applied to the components to be bonded in a direction normal to the bond interface at high temperatures, such that atoms of respective bonding surfaces of the articles intermingle over time to form a bonded article.

In some cases, an interlayer is provided between the first and second articles in order to provide improved alignment between the first and second articles. Such a method is described in US 2011035924, in which a powder metal interlayer is interposed between the respective bonding surfaces. In one embodiment, an interlayer in the form of a preform metal powder ring is interposed between the bonding surfaces and subsequently heated and pressed by the other article to form a consolidated interlayer bonded to the respective bonding surfaces of the articles. The powdered metal interlayer may be partially consolidated and formed via conventional rolling or cold compression, before being placed between the articles and subjected to heat and pressure to diffusion bond the articles together.

However, in the case of US2011035924 it is limited in its range of application having a bond of limited strength, and is constrained by its requirement to have a symmetrical primitive geometry.

It has been found by the inventors that, even where the first and second articles are polished to a low surface roughness, some protrusions in the surfaces of the first and second articles remain. Where electrical resistance heating is used to heat the articles and interlayer to the required temperature to initiate diffusion bonding, electrical arcing between the protrusions can lead to localised heat spikes in the first and second articles. It is thought that these heats spikes cause localised melting during the bonding process, which may result in differentiation of the alloy, and so a weakened bond in those areas.

The present invention describes a bonding method which seeks to overcome some or all of the above problems.

SUMMARY OF THE INVENTION

According to a first aspect of the present invention, there is provided a method of forming a bonded article, the method comprising:
providing first and second articles, the first and second articles each having a respective bond surface;
providing a porous interlayer region interposed between the bond surfaces of the first and second articles, the interlayer region having a porosity of between approximately 10% and 30%; and
subsequently locally heating the interlayer region under contact pressure to a bonding temperature below the melting temperature of the interlayer region and the first and second articles to thereby bond the interlayer region to the first and second articles to form the bonded article.

Accordingly, the invention provides a method of bonding first and second articles which has been found to result in an improved strength bond. The porosity of the interlayer region provides improved mechanical interlocking between the first and second articles during the bonding step, thereby maintaining the relative positions of the first and second articles. The method also provides improved bonding strength between the first and second articles. The porous interlayer region provides a source of vacancy rich material for assisting grain growth from parent grains from the bonding surfaces of the first and second articles into the interlayer, being most favourable for grains which are not optimally aligned thus promoting accelerated diffusion driven grain growth across the interface.

The porous interlayer region may comprise closed pores, such that the porous interlayer region comprises a plurality of closed cells.

Alternatively, the porous interlayer region may comprise open pores, such that the porous interlayer comprises a plurality of interconnected cells. Advantageously, where the porous interlayer comprises open pores, the material from the adjacent first or second article has been found to plastically flow around the ligaments joining the cells, thereby improving bonding between the layers.

The cells of the porous interlayer region may comprise cells generally having an aspect ratio of less than 3:1. It has been discovered by the inventors that cells having a high aspect ratio collapse more readily than cells having a low aspect ratio, and this permits bonding to occur between the articles at lower pressure, as well as preventing voids remaining in the bonded article. The cells may have an average diameter of between 0.15 and 1 mm. The cells may have an average diameter of between approximately 0.3 mm and 1 mm, and in one example, the cells may have an average length of 0.64 mm, and may have an average width and or thickness of 0.35 mm.

The interlayer region may have a thickness of between 0.05 and 1 mm. Advantageously, the interlayer region is sufficiently thick to act as a buffer layer between the faying surfaces of the first and second articles, without being excessively thick so as to introduce imprecision and require excessive upset of the first and second articles to achieve full consolidation of the interlayer region which would otherwise result in excessive loss of material of the first and second articles. The porous interlayer region may comprise a lip comprising an edge region having a greater thickness than a central region. The porous interlayer region may be dimensioned such that the lip extends either side of the first and second layers, such that the lip is not located between the first and second articles. Advantageously, the lip contains extrusion from the bonding region during upset, and may also assist with fitting the remainder of the porous interlayer region in between the first and second articles.

The interlayer region may have a surface roughness parameter on at least one faying surface of greater than 25 Ra due to the pores of the interlayer region. It has been found by the inventors that a surface roughness greater than 25 Ra aids mechanical interlocking with the faying surfaces and enhances plastic collapse of the interlayer region.

The step of providing a porous interlayer region interposed between the bonding surfaces of the first and second articles may comprise providing an additive coating on the respective bonding surface of one or both of the first and second articles. The step of providing an additive coating may comprise an additive manufacturing method such as one or more of cold spraying, laser assisted cold spraying, blown powder laser deposition and vacuum plasma spraying. Advantageously, the porous interlayer region is provided directly on one or both of the first and second articles, thereby reducing part count, and ensuring accurate alignment of the interlayer region and at least one of the first and second articles. The use of an additive layer manufacturing method enables the porous interlayer region to have the desired porosity and pore size, shape and distribution. Additive manufacturing methods have the further advantage of being relatively quick and inexpensive, while reducing part count.

Alternatively, the step of providing a porous interlayer region interposed between the bonding surfaces of the first and second articles may comprise selectively removing surface material. The step of selectively removing surface material may comprise removing material by a power beam material processing method such as any of volatilisation, ablation and etching.

In a still further alternative, the step of providing a porous interlayer region interposed between the bonding surfaces of the first and second articles may comprise providing a power beam such as a laser or an electron beam, and moving the focus of the beam on a surface of one of the first and second articles to move material of the respective article. This method is known to move surface material using surface tension gradients established by thermal gradients set up by the moving power beam.

Alternatively or additionally, the step of forming a desired surface profile on one or more surfaces of the porous interlayer region may comprise removing surface material by a power beam material processing method such as any of volatilisation, ablation and etching.

The step of providing a porous interlayer region between the bonding surfaces of the first and second articles may comprise forming a porous preform article, and interposing the porous preform article between the bonding surfaces of the first and second articles.

The step of forming the porous preform article may comprise an additive manufacturing process such as any of cold spraying, laser assisted cold spraying, blown powder laser deposition and vacuum plasma spraying. Alternatively, the step of forming the porous preform article may comprise a powder metallurgy process such as cold isostatic pressuring (CIP), hot isostatic pressing (HIP) or sintering, or a combination of these processes. Advantageously, by using either an additive manufacturing process or a powder metallurgy process to form the preform, the porosity, pore density and pore size can be accurately controlled.

The step of forming the porous interlayer region may be carried out in a controlled low oxygen/interstitial environment. For example, the step of forming the porous interlayer may be carried out in an inert gas environment having less than 10 parts per million (ppm) of oxygen and less than approximately 5 ppm moisture and a dew point of less than −65° C. Alternatively, the step of forming the porous preform may be carried out in a vacuum having a pressure of less than $10^{-4}$ Torr (130 Pascals). This is particularly advantageous where the porous interlayer comprises closed cells, as gas remaining within the closed cells may otherwise prevent full consolidation of the porous interlayer region.

The step of providing a porous interlayer region interposed between the bond surfaces of the first and second articles may comprise aligning the crystallographic orientation of the porous interlayer region with the crystallographic orientation of one or both of the first and second articles. Advantageously, where the first and second articles have a crystallographic orientation, the bond strength can be improved by matching the crystallographic orientation of the porous interlayer with that of the first and/or second articles.

The step of locally heating the interlayer region may comprise electrical resistance heating of the interlayer by passing an electrical current through the interlayer. Advantageously, where electrical resistance heating is used, the porous structure concentrates the current density in the interlayer, and therefore heating along the joint line, minimising thermal disruption to the surrounding parent material in the first and second articles. The porous interlayer also provides more even heating compared to prior interlayers, resulting in an improved bond due to the absence of hot spots.

The porous interlayer region may comprise the same material as the bonding surfaces of the first and second articles. The bonding surfaces first and second articles may comprise titanium or titanium alloy such as Ti6V4Al alloy, and the porous interlayer region may comprise titanium or titanium alloy. Alternatively, at least one of the first and second articles and the porous interlayer may comprise an intermetallic compound such as gamma titanium aluminide.

The bonded articles may comprise a gas turbine engine component. For example, the method may be utilised to fabricate or repair a gas turbine engine component such as a variable inlet guide vane (VIGV) actuator lug, casing boss, Blisk aerofoil and blisk circumferential joints. In one specific example, the method may be utilised to replace a stage of a blisk drum.

According to a second aspect of the invention there is provided a bonded article comprising first and second articles and a porous interlayer region bonded together in accordance with the first aspect of the invention.

BRIEF DESCRIPTION OF THE DRAWINGS

FIG. 3b shows a close-up of part of the interlayer of FIG. 3a.

DETAILED DESCRIPTION

Figure 1:
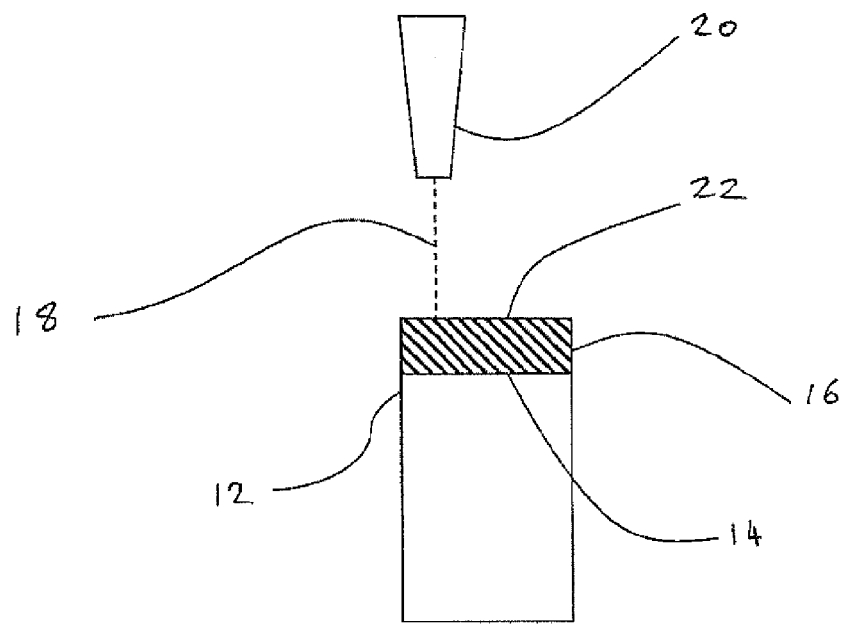
FIG. 1 shows a first step of a first bonding method.

FIG. 1 shows a first step of a first bonding method. The method comprises providing a first article in the form of a blisk 12 having a bonding surface 14, and applying a porous interlayer region 16 on the surface 14 by an additive manufacturing process, then diffusion bonding the first article 12 and porous interlayer 16 to a second article 26. At least the bonding surface 14 of the blisk 12 comprises a titanium alloy such as Ti6V4Al alloy having a metallurgically clean surface 14. Alternatively, one or both of the articles 12, 14, and also perhaps the interlayer 16 could comprise an intermetallic compound such as gamma titanium aluminide (γTiAl). The metallurgically clean surface may be provided by a suitable material removal process such as chemical etching, laser cleaning or solvent cleaning.

Figure 2:
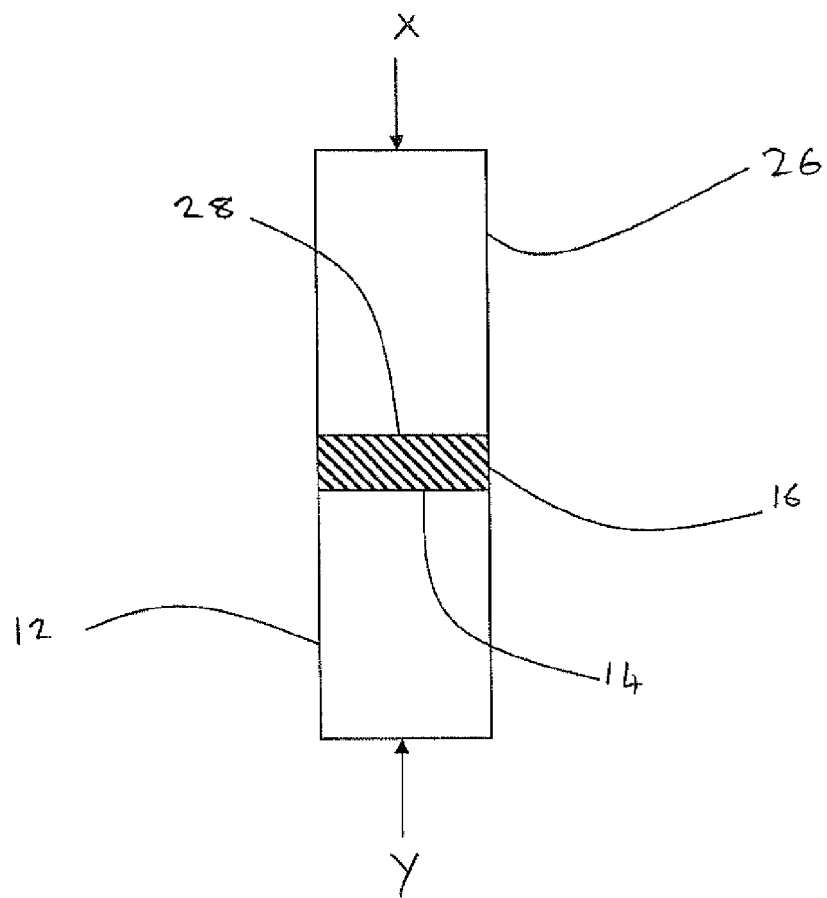
FIG. 2 shows a second step of a first bonding method.
Figure 3A:
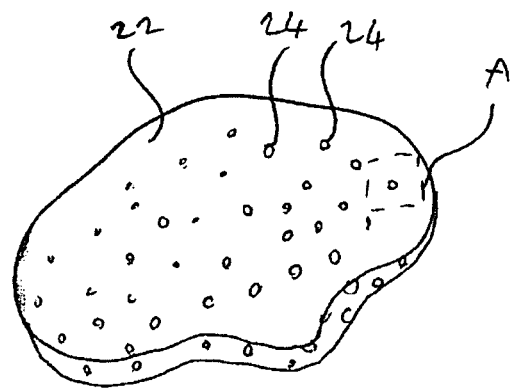
FIG. 3a shows a porous interlayer used in the bonding method of FIGS. 1 and 2.
Figure 3B:
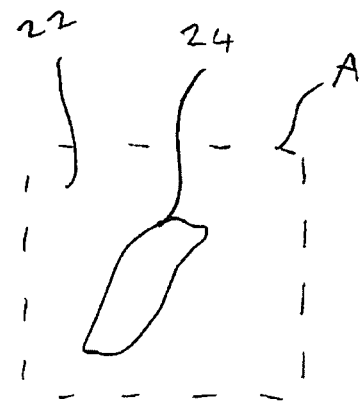
Figure 3C:
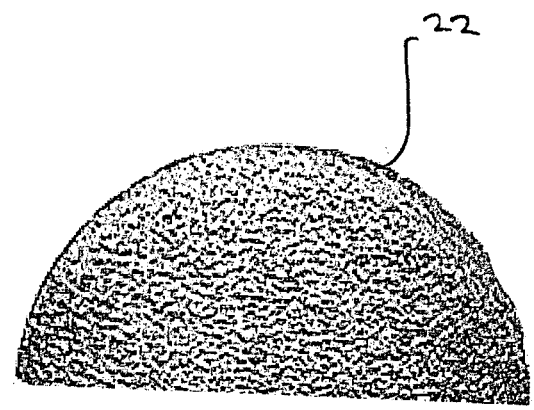
FIG. 3c shows a plan view of the interlayer of FIG. 3a, showing the surface roughness of the interlayer.

In the embodiment shown in FIGS. 1 to 3, the additive manufacturing process comprises cold spraying, also known as cold gas dynamic spraying. In the cold spraying method illustrated in FIG. 1, relatively small metal particles 18 (ranging in size from approximately 5 μm to 150 μm in diameter, or in some cases from 15 μm to 50 μm in diameter) in a solid state are accelerated from a nozzle such as a de Leval nozzle 20 to a critical high velocity (typically 300-1400 m/s), and subsequently plastically deform (or melt) and develop a deposit on the bonding surface 14. The nozzle 20 is rastered backward and forward across the surface 14 to build the required structure having the required porosity, pore size and dimensions. As each layer is built, the process is repeated to build a new layer. Since cold spraying does not involve melting the metal powder, elemental segregation of the metal powder is avoided. Cold spraying has also been found to provide good bonding integrity between the interlayer 16 and the bonding surface 14. Furthermore, cold spraying has been found to increase the crystallographic disruption (dislocation density), which speeds diffusion by providing additional pathways and entropy to be reduced by stabilising grain shapes.

The additive manufacture process can be used to provide a desired textured surface for the porous interlayer 16. The desired textured surface comprises a series of protrusions and cavities, such that the porous interlayer 16 has a surface roughness parameter of approximately 25 Ra (where Ra is the arithmetic average of the roughness profile).

FIG. 3a shows the porous interlayer 16 in more detail. The porous interlayer 16 has a thickness of typically 50-500 μm and the upper surface 22 has a shape roughly equal to that of the bonding surface 14. The porous interlayer region 16 comprises a plurality of either closed or open pores (or a mixture of the two) in the form of cells 24 distributed evenly throughout the interlayer 16. Where the cells 24 are closed, or the additive manufacturing process comprises one involving a molten material (such as electron beam melting (EBM)), the additive manufacturing process must be carried out in a low pressure, low oxygen environment to allow consolidation in the bonding step, as described below. The porous interlayer 16 has a porosity of approximately 10% to 30%, that is to say the internal volume defined by the pores comprises 10% to 30% of the total volume of the interlayer 16. In other words, the porous interlayer 16 has a density of approximately 70% to 90% of the fully consolidated density of the material of the interlayer (i.e. Ti6Al4V in the described embodiment).

FIG. 3b shows a close up view of one of area A of FIG. 3a, showing one of the cells 24. The cells 24 have an average diameter at their longest point of between about 0.3 mm and 1 mm and have an aspect ratio (i.e. the ratio between the length at the longest point and the width at the shortest point) of less than about 3:1. In the described embodiment, the pores have a length at their longest point of approximately 0.64 mm, and a width of approximately 0.35 mm. This ensures collapse of the pores during the bonding step, thereby preventing the formation of voids in the bonded article, and reducing the pressure required for the bonding step.

Once the interlayer region 16 is formed in the first step, and the desired surface profile 22 is formed, the first article 12 is bonded to a second article 26 along respective bonding surfaces 14, 28 in a second step. The second article comprises a component 26. The component 26 could comprise a component of a gas turbine engine (not shown) such as a variable inlet guide vane (VIGV) actuator lug, casing boss, blisk aerofoil or blisk circumferential joint. The component 26 comprises a metal such as titanium alloy, and has a metallurgically clean bonding surface 28.

The third step is illustrated in FIG. 2 The second article 26 is placed on top of the upper surface 22 of the interlayer region 16 such that the respective bonding surfaces 14, 28 of the first and second articles 12, 26 lie approximately parallel to one another, with the porous interlayer region 16 interposed between the respective bonding surfaces 14, 28.

The first and second articles 12, 26 and interlayer region 16 are then bonded together in a pressure assisted bonding step. In the pressure assisted bonding step, the porous interlayer region 16 is locally heated until a desired temperature is reached. Axial pressure is simultaneously applied normal to the interface between the first and second articles 12, 26 to bond the first 12 and second 26 articles together. Fixtures may be employed to hold the articles 12, 26 together during the second step. The resultant bonding is thought to be a result of a combination of creep (i.e. plastic flow) of the materials of the bonding surfaces of the first and second articles 12, 26 in to the cells formed in the interlayer region 16, and diffusion bonding of the interlayer region 16 with the bonding surfaces of the first and second articles 12, 26.

In the described embodiment, the porous interlayer region 16 is locally heated by electrical resistance heating, in which an electrical current is passed through the porous interlayer region 16. The current could be AC, DC, or pulsed DC. For example, where the current is AC power, the root mean squared (RMS) power may be approximately 850 watts, the RMS voltage may be approximate 2 volts, and the RMS current may be approximately 360 amps, and the resistance may be 1 to 2 milli-ohms. Advantageously, the porous structure of the interlayer region 16 concentrates current density and therefore heating along the joint line, minimising thermal disruption to the surrounding parent material, thereby preventing or reducing the extent of a heat affected zone in the bonded article. The pores provide additional paths for the electrical current to flow, thereby reducing arcing between peaks in the surfaces of the articles 12, 26 and interlayer region 16. The desired temperature achieved during heating is a temperature below the melting point of the materials of the first and second articles 12, 26 and interlayer region 16, but sufficiently high to allow plastic deformation and diffusion bonding to occur at the axial pressure used. For example, for titanium alloys, the temperature in the porous interlayer is raised to approximately 900-1000° C., and maintained for approximately 15 to 45 minutes.

Before or during heating, axial pressure is applied normal to the interface between articles 12, 26. In the described embodiment, the pressure applied is up to 25 MPa. The porous structure of the interlayer 16 allows for substantially uniform load application due to the perpendicular interface relative to the primary loading axis and therefore uniformity of processing conditions across the bonding surfaces 14, 28. Furthermore, the use of the porous interlayer 16 provides mechanical interlocking between the articles 12, 26 and interlayer 16 on a particle level through plasticity, which may be thermally-assisted. This abutment of heavily worked material provides a source of vacancy rich material for assisting grain growth from parent grains of the first and second articles 12, 26 into the interlayer 16, being most favourable for grains which are not optimally aligned, thus promoting accelerated diffusion driven grain growth across the interface. Consequently, the process provides a good bond between the first and second articles 12, 26. The plasticity of the porous interlayer 16 also allows for a degree of imprecision with respect to the alignment of the interlayer 16 between the first and second articles 12, 26, due to increased material flow during the diffusion bonding step. The interlayer 16 is also sufficiently strong to allow handling between forming the interlayer 16 and the pressure assisted bonding step.

The axial pressure may be applied in first and second stages. In the first stage, a relatively large pressure is applied to the heating articles 12, 26 and interlayer region 16 for a relatively short duration, such that the pores of the interlayer region 16 collapse to substantially fully consolidate the interlayer region 16. This process is a substantially plastic process, and therefore requires a relatively large pressure (such as around 35 MPa in some cases) for a relatively short duration, such as a few minutes.

In the second stage, the pressure is reduced, and held for a longer period. In this stage, the first and second articles 12, 26 and interlayer region 16 are bonded together to form the bonded articles. Since this process is largely a diffusion bonding process, the pressures required are lower and generally take a longer amount of time, such as an hour or longer.

Figure 10:
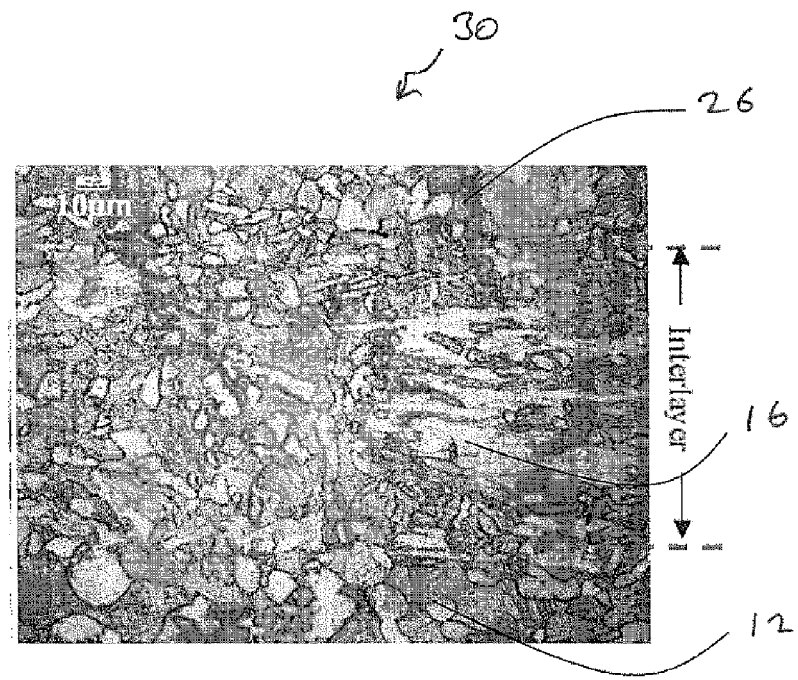
FIG. 10 shows a cross sectional view of the bonding region of an article formed by an alternative bonding method in accordance with the present disclosure.

FIG. 10 shows a cross section of a bonded article 30 bonded in accordance with the above method. As can be seen, the bond is continuous, having no cavities or discontinuities. It can also be seen that the grains of the interlayer 16 have interacted with the parent material of the first and second articles 12, 26, providing a good metallurgical bond. As can be seen, the joint interface is not planar (i.e. there is no distinct dividing line between the interlayer 16 and first and second articles 12, 26). Rather, the grains of the interlayer 16 and articles 12, 26 grow into one another across the respective interfaces during bonding, creating an exceptionally strong bond. This bond shown in FIG. 6 has been tested, and has been found to be of satisfactory quality.

Figure 4:
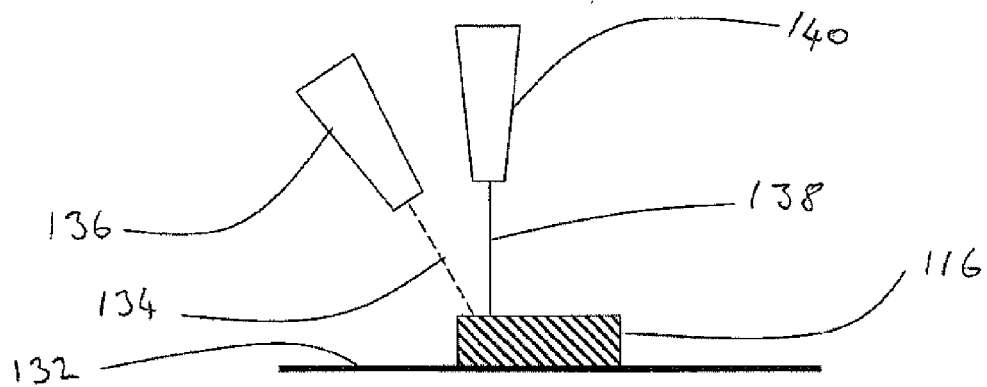
FIG. 4 shows a first step of a second bonding method.
Figure 5:
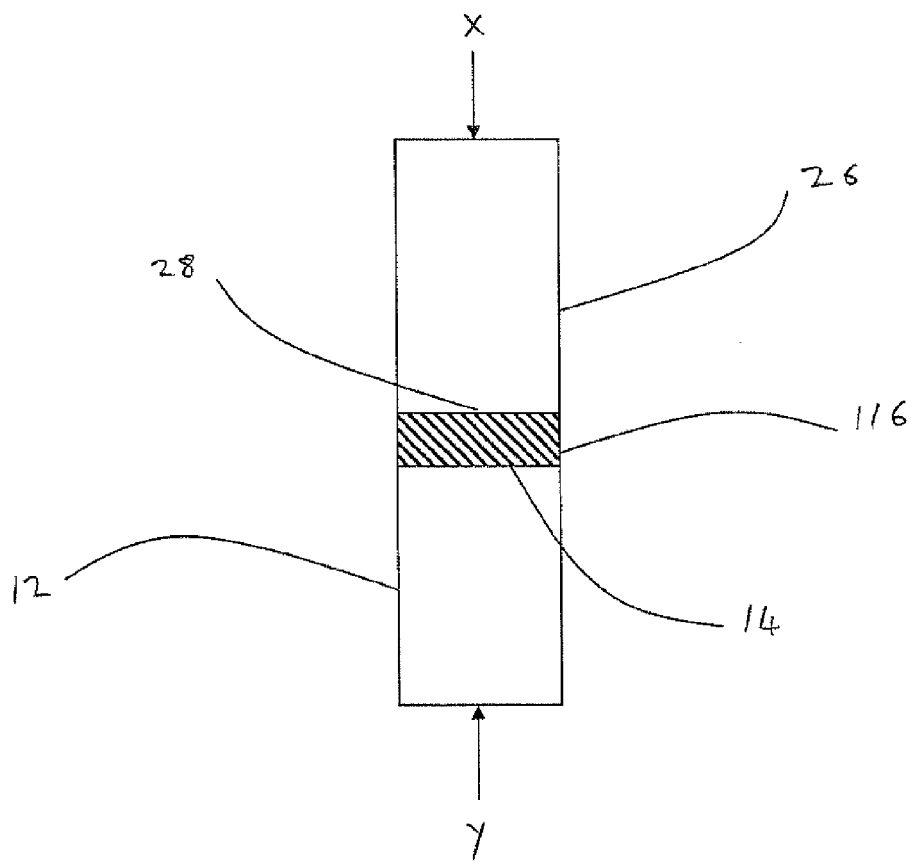
FIG. 5 shows a second step of the second bonding method.

FIGS. 4 and 5 show an alternative bonding method in accordance with the present disclosure. The bonding method is similar to the bonding method shown in FIGS. 1 and 2, except that in a first step, the porous interlayer region 116 is produced as a separate preform on a substrate 132. The porous pre-form 116 in this embodiment could be formed by any suitable additive manufacturing process, such as cold spraying or laser assisted cold spraying. In the embodiment shown in FIG. 4, the porous preform 116 is produced by blown powder deposition, in which powder 134 of a suitable material is directed towards the substrate 132 from a nozzle 136, and enters the path of a laser beam 138 from a laser 140 which briefly brings the powder 134 and the substrate 132 to a molten state before solidifying and raising the overall height of the substrate 132 to form the interlayer 116, layer by layer. The laser beam 138 is moved backward and forward across the substrate 132 to build the required interlayer 116, with the beam being maintained substantially perpendicular to the substrate 132 to ensure the energy density is evenly distributed.

The additive manufacturing process is carried out in either a low oxygen or a low pressure environment to prevent oxidation of the interlayer 116. Where the additive manufacturing process is carried out in a low oxygen environment, the process is carried out in an inert gas environment (such as argon) having less than 10 parts per million (ppm) of oxygen and less than approximately 5 ppm moisture and a dew point of less than −65° C. Alternatively, where the additive manufacturing process is carried out in a low pressure environment, the process may be carried out in an environment having a pressure of less than $10^{-4}$ Torr (130 Pascals).

Once the porous interlayer preform 116 is manufactured, the desired surface roughness is formed in a similar process to that of the first embodiment, either via the additive manufacturing process, or via a separate surface treatment step. The porous interlayer preform 116 is then interposed between the respective bonding surfaces 14, 28 of the first and second articles 12, 26 and bonded together by applying heat and pressure. Again, the pressure may be applied in two stages, with the second stage having a longer duration and lower pressure than the first.

The geometry of the preform 116 is similar to that of the interlayer region 16, having a similar porosity, and pores of a similar size and shape. The preform 116 may additionally include a thicker section of higher density to impart greater rigidity.

Bonds of similar strength can be achieved using this method as by the first method. However, it may be more convenient to use this method. In particular, the pre-forms 116 can be mass produced ahead of time without requiring access to the first and second articles 12, 26, thereby reducing repair times. However, such a process results in an increased part count and requires alignment between the preform and the first and second articles 12, 26. There is also a risk that chemical incompatibility due to slight differences in alloy composition of the interlayer 116 compared to the articles 12, 26 may result in reduced bond strength.

Figure 9:
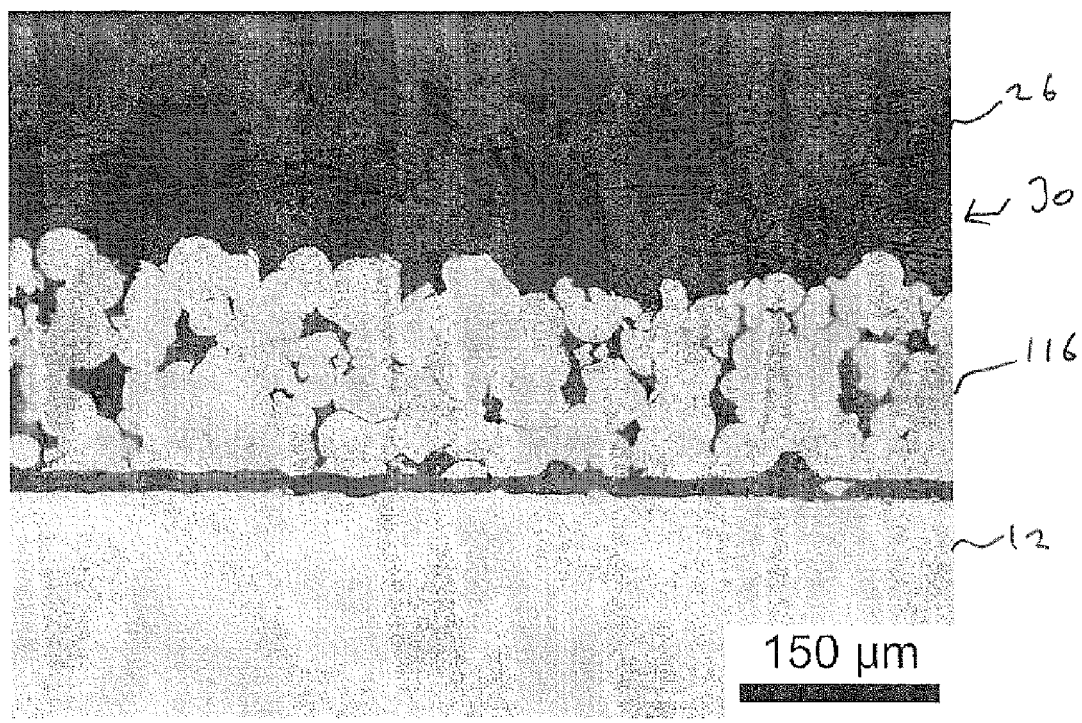
FIG. 9 shows a cross sectional view of an article formed by a bonding method in accordance with a method in accordance with the present disclosure.

FIG. 9 shows a bonded article 30 produced using this method. As can be seen, again, no voids are present, indicating a good quality bond.

Figure 6:
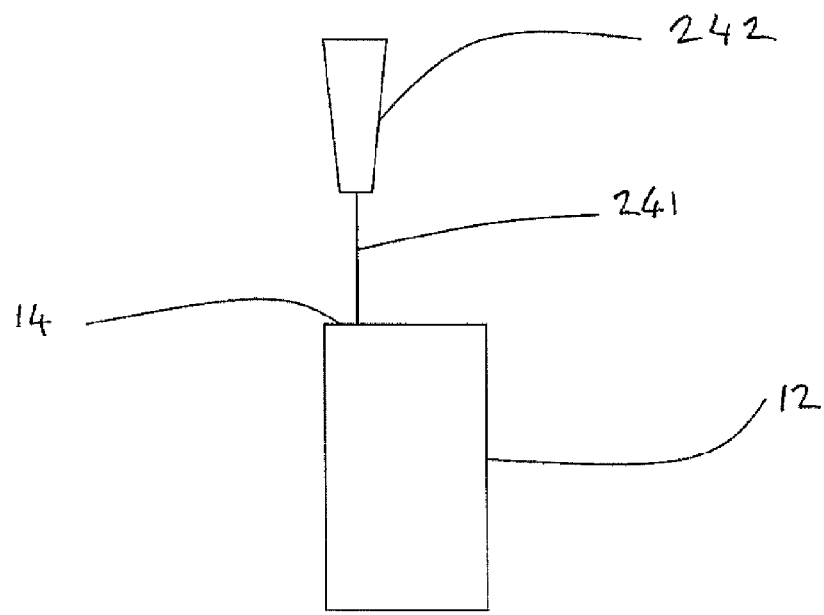
FIGS. 6, 7a and 7b show a first step of a third bonding method.

FIG. 6 shows a first step of a third method of bonding first and second articles 12, 26 which seeks to overcome the potential chemical incompatibility problem described above.

In the first step, a power beam such as an electron beam or a laser is used to form surface pores 224 in the bonding surface 14 of the first article 12, thereby forming an interlayer region 216 in the bonding surface 14.

Figures 7A, 7B:
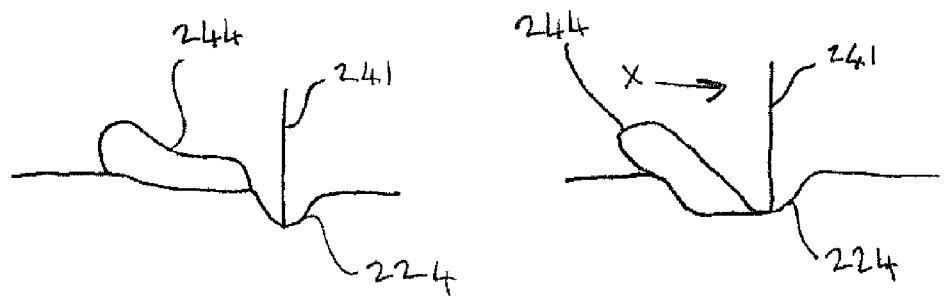

In the described embodiment, the power beam is provided in the form of an electron beam 241 provided by an electron gun 242. As shown in FIGS. 7a and 7b, the electron beam 241 is rapidly traversed across the bonding surface 14 of the first article 12 in a direction X. The electron beam 241 power and rate of movement are adjusted such that a portion of the surface 14 is melted to form a bead 244 of molten metal, and a pore 224. As the beam 241 is traversed across the surface 14, over the surface 22, the bead 244 is forced in a direction away from the beam 241 by surface tension gradients set up by thermal gradients as a result of the electron beam 241. The bead 244 quickly solidifies to form a projection of roughly the shape shown in 244.

Once a pore 241 and projection 244 are formed, the electron beam 241 is turned off, and the gun 242 moved to a new location to form a new pore 241 and projection 244. In this way, a porous interlayer region 216 is formed consisting of an array of protrusions 244 above the original surface 14 and a corresponding array of pores 224 in the form of intrusions or cavities in the substrate. Following the first step, the bonding surface 14 of the first article 12 has a surface roughness parameter of approximately 25 Ra. In this embodiment therefore, the interlayer region 216 comprises the region of the first article 12 in which the pores 241 and protrusions 244 are formed. Consequently, the thickness of the interlayer region 216 is the distance between the top of the projections 244 and the bottom of the pores 241. The porosity of the interlayer 216 is therefore defined as the area of this region 216 not occupied by solid metal prior to the bonding step.

Figure 8:
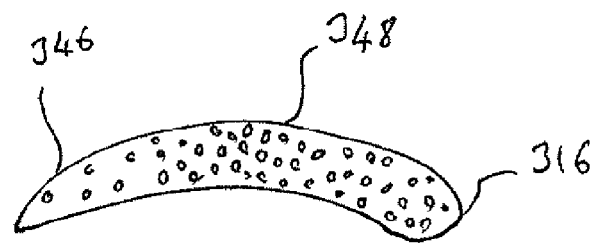
FIG. 8 shows an alternative porous interlayer suitable for use in any of the methods of FIGS. 1 to 7.

FIG. 8 shows an alternative interlayer 316. The interlayer 316 comprise a first region 346 having a first width in a direction extending parallel to the bonding surfaces, and a second region 348 having a second width greater than the first thickness. Such a configuration could be encountered where the first and second articles comprise parts of an aerofoil component such as a blade or vane of a gas turbine engine, where the leading edge and central portions of the blade typically have a thicker profile compared to the trailing edge. Alternatively, the thickness of the interlayer 316 in a direction normal to the bonding surfaces could vary in a similar manner.

Both the first region 346 and second region 348 comprise pores 324. However, more pores 324 (and/or larger pores 324) are provided for a given volume of the second region 348 compared to the first region 346 such that the second region 348 has a lower density in comparison to the first region 346. Consequently, when an electric current is passed through the interlayer 316 to heat the interlayer region during the bonding step, the electrical resistance provided by the second region 348 is higher than that provided by the first region 346. The relative densities of the first and second regions 346, 348 may be tailored such that the overall heating of the first and second regions 346, 348 is substantially similar. Consequently, the method can be applied to interlayers having non-uniform thickness, while still providing uniform heating, thereby forming a consistent bond between the first and second articles 12, 26 and interlayer region 316.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Features of either embodiment can be used with those of the other embodiment. Various changes to the described embodiments may be made without departing from the spirit and scope of the invention.

For example, whether the porous interlayer comprises any of an additive coating on one of the articles, or as a separate preform, the porous interlayer may be formed using a different additive manufacturing technique.

For example, laser assisted cold spray (LACS) could be used. Laser assisted cold spraying is similar to cold spraying, except that the substrate is first pre-treated by heating with a laser, such as a NdYAG laser, to heat the surface prior to the metal powder being deposited on the bonding surface. Depending on the set-up, some particles may be heated in flight by the laser.

In a further example, vacuum plasma spraying (also known as thermal spraying) could be used. In vacuum plasma spraying, metal particles are heated to above their melting points or to a temperature at which the metal becomes plastic, and then sprayed onto the substrate to form a layer of material.

A different method may also be employed for obtaining the desired surface profile in the embodiment in which the interlayer is formed in the bonding surface of the first articles. For example, the method could comprise one or more of volatisation, laser ablation, and power beam assisted etching.

The method could comprise an inspection step subsequent to forming the interlayer to determine the size and distribution of the pores or the surface roughness of the bonding surfaces. For example, an X-ray or ultrasound non-destructive inspection method could be employed.

A plurality of porous interlayer regions could be provided between the first and second articles. In one example, a porous interlayer region could be formed on the bonding surface of each of the first and second articles.

Although the invention has been described with reference to joining titanium alloys, the invention could be equally applicable to other materials, such as, but not limited to, nickel based superalloys. The first and second articles could comprise dissimilar metals. Where the first and second articles comprise dissimilar metals, the grain size or chemical composition of the interlayer could be graduated, with larger grains of one chemical composition being provided adjacent the first article, and smaller grains of a different chemical composition being provided adjacent the second article.

Where the first and second articles have a bulk crystallographic orientation, the interlayer could be aligned with the crystallographic orientation of the first and/or second articles to provide further increased bond strength, thereby better matching the material properties of the first and second articles when bonded.

There may be different prevailing crystallographic orientations between the two articles. The invention could be used to bond different types of articles. For example, the articles could comprise partially or fully consolidated components produced by a Hot Isostatic Pressing (HIP) process. The invention is particularly suitable for high integrity stud welding and for welding high integrity attachment hooks in gas turbine engines. The invention could be used for cladding applications for niche applications. The invention could be used to create run-off and run-on tabs for friction stir welding applications. The invention is particularly well suited to joining of TiAl turbine blades to discs.

Variations could be provided in the process variables used in the pressure assisted bonding step. For example, heat may be provided continuously, or in phases. The pressure may also be varied so as to control the upset; this may be phased with the heating.

The invention claimed is:

1. A method of forming a bonded article, the method comprising:
   providing first and second articles, the first and second articles each having a respective bond surface;
   providing a porous interlayer region interposed between the bond surfaces of the first and second articles, the interlayer region having a porosity of between approximately 10% and 30%; and
   subsequently locally heating the interlayer region under contact pressure to a bonding temperature below the melting temperature of the interlayer region and the first and second articles to thereby bond the interlayer region to the first and second articles to form the bonded article, wherein the step of locally heating the interlayer comprises electrical resistance heating of the interlayer by passing an electrical current through the interlayer region.

2. A method according to claim 1, in which the porous interlayer region comprises cells having an aspect ratio of less than 3:1.

3. A method according to claim 1, wherein the porous interlayer region comprises cells having an average diameter of between 0.3 mm and 1 mm.

4. A method according to claim 1, wherein the cells have an average length of 0.64 mm.

5. A method according to claim 1, wherein the interlayer has a thickness of between 0.05 mm and 1 mm.

6. A method according to claim 1, wherein the porous interlayer region has a surface roughness parameter of greater than 25 Ra.

7. A method according to claim 1, wherein the porous interlayer region comprises
one or more sub-regions higher having a first porosity, and
one or more sub-regions having a second, higher porosity.

8. A method according to claim 1, wherein the step of providing a porous interlayer region interposed between the bonding surfaces of the first and second articles comprises providing an additive coating on the respective bonding surface of one or both of the first and second articles.

9. A method according to claim 8, wherein the step of providing an additive coating comprises an additive manufacturing method of at least one or more of cold spraying, laser assisted cold spraying, blown powder laser deposition and vacuum plasma spraying.

10. A method according to claim 1, wherein the step of providing a porous interlayer region interposed between the bonding surfaces of the first and second articles comprises providing a power beam of a laser or an electron beam, and moving the focus of the beam on a surface of one of the first and second articles to move material of the respective article.

11. A method according to claim 1, wherein the step of providing a porous interlayer region between the bonding surfaces of the first and second articles comprises forming a porous preform article, and interposing the porous preform article between the bonding surfaces of the first and second articles.

12. A method according to claim 11, wherein the step of forming the porous preform article comprises an additive manufacturing process.

13. A method according to claim 1, wherein the porous interlayer region comprises the same material as the bonding surfaces of the first and second articles.

14. A method according to claim 1, wherein one or more of the first article, second article and porous interlayer region comprises titanium alloy.

15. A method according to claim 1, wherein the cells have an average width of 0.35 mm.

* * * * *